United States Patent [19]

Hong

[11] Patent Number: 5,345,276
[45] Date of Patent: Sep. 6, 1994

[54] SPECTRUM DISTRIBUTION LUMINANCE/COLOR SIGNAL SEPARATING DEVICE

[75] Inventor: Sung H. Hong, Seoul, Rep. of Korea

[73] Assignee: Gold Star Co., Ltd., Seoul, Rep. of Korea

[21] Appl. No.: 980,663

[22] Filed: Nov. 24, 1992

[30] Foreign Application Priority Data

Nov. 26, 1991 [KR] Rep. of Korea .................. 91-21339

[51] Int. Cl.$^5$ .............................................. H04N 9/78
[52] U.S. Cl. .................................... 348/663; 348/669
[58] Field of Search .............. 358/31, 105; H04N 9/78

[56] References Cited

U.S. PATENT DOCUMENTS

| | | | |
|---|---|---|---|
| 4,707,732 | 11/1987 | Matono et al. | 358/31 |
| 4,754,322 | 6/1988 | Okuda et al. | 358/31 |
| 4,764,964 | 8/1988 | Tanaka et al. | 358/31 |
| 4,982,271 | 1/1991 | Sugiyama et al. | 348/669 |
| 4,984,068 | 1/1991 | Sugiyama et al. | 358/31 |

FOREIGN PATENT DOCUMENTS 133886 6/1987 Japan .................. H04N 9/78

*Primary Examiner*—James J. Groody
*Assistant Examiner*—Glenton B. Burgess
*Attorney, Agent, or Firm*—Poms, Smith, Lande & Rose

[57] ABSTRACT

A composite video signal is separated into a luminance signal and a color signal according to spectrum distributions thereof. A band-pass filter extracts a composite video signal existing in a predetermined frequency band; a band-rejection filter removes a composite video signal existing in a predetermined frequency band; first and second line comb filters each separate a luminance signal and a color signal from an output signal of the band-pass filter; a frame comb filter separates a luminance signal and a color signal from an output signal of the band-pass filter by a correlation between frames; a vertical variation detector detects a picture variation component in a vertical axis from an output signal of the band-pass filter; a temporal variation detector detects a picture variation component in a temporal axis from an output signal of the band-pass filter; a horizontal variation detector detects a picture variation in a horizontal axis from the composite video signal; a first mixer mixes the color signals separated by the first and second line comb filters and the frame comb filter and an output signal of the band-pass filter according to output signals of the horizontal, vertical and temporal variation detectors; and a second mixer mixes luminance signals separated by the first and second line comb filters and the frame comb filter and an output signal of the band-rejection filter, according to output signals of horizontal, vertical and temporal variation detectors.

3 Claims, 8 Drawing Sheets

SPECTRUM DISTRIBUTION LUMINANCE/COLOR SIGNAL SEPARATING DEVICE

BACKGROUND OF THE INVENTION

The present invention relates to a device for separating a quadrature modulated composite video signal into a luminance signal and a color signal in a television receiver, and more particularly to a luminance/color signal separating device which separates a composite video signal into a luminance signal and a color signal according to spectrum distribution of luminance signal and color signal, thereby preventing dot trouble, deterioration of picture quality and vertical resolution.

In a quadrature modulated color television type such as an NTSC type and a PAL type, the composite video signal is composed of a luminance signal and a color signal interleaved in the luminance signal to minimize an occupied frequency band. The luminance signal and the color signal included in the composite video signal have spectrum distribution having large superposed region with each other in horizontal, vertical, and temporal frequencies, as a picture varies in horizontal, vertical, diagonal, and temporal directions. Accordingly, a luminance/color signal separating device used in a television receiver should separate the composite video signal into a luminance signal and a color signal according to the spectrum distribution of luminance signal and color signal.

However, the conventional luminance/color signal separating circuit separates the composite video signal into a luminance signal and a color signal by a line comb filter utilizing the characteristic of phase inversion of color signal in every line, or by a frame comb filter utilizing the characteristic of phase inversion of color signal in every frame, thereby causing the dot trouble, the deterioration of picture quality and vertical resolution.

In detail, when the composite video signal has a picture rapidly changed in a vertical direction, a color signal component is included in a luminance signal separated by the line comb filter and a luminance signal component is included in the separated color signal, so that the dot trouble, and the deterioration of picture quality and vertical resolution are generated by the color signal component and luminance signal component included in the separated luminance signal and the separated color signal, respectively. When the composite video signal has a picture varying in a temporal direction, a color signal component is included in a luminance signal separated by the frame comb filter and also a luminance signal component is included in a color signal separated by the frame comb filter, so that the dot trouble, the deterioration of picture quality and vertical resolution, etc. are generated by the color signal component and luminance signal component included in the separated luminance signal and color signal, respectively.

To solve the problems of the line comb filter and the frame comb filter, a motion adaptive luminance/color signal separating device is suggested. The motion adaptive luminance/color signal separating device comprises the line comb filter for separating the composite video signal into a luminance signal and a color signal according to the characteristic of the phase inversion of color signal per line, a frame comb filter for separating the composite video signal into a luminance signal and a color signal according to the characteristic of the phase inversion of color signal per frame, and a means for detecting a motion of picture from the composite video signal and switching the operation of the line comb filter and the frame comb filter according to the detected picture motion signal. However, the motion adaptive luminance/color signal separating device also has the problems of generating the dot trouble, and the deterioration of picture quality and vertical resolution by the color signal component and luminance signal component included in the separated luminance and color signals, when the motion of picture is incorrectly detected. And, when there is a picture motion, and the picture changes rapidly in a vertical axis direction, the luminance and color signals separated by the line comb filter include the color signal component and the luminance signal component, respectively, so that the motion adaptive luminance/color signal separating device cannot prevent the dot trouble, and the deterioration of picture quality and vertical resolution. These problems are described in detail with reference to the accompanying drawings as follows.

With reference to FIG. 1, a composite video signal of NTSC type including a luminance signal Y, and first and second chrominance signals I and Q is described. The luminance signal Y is distributed in a frequency band of 4.2 MHz, and the first and second chrominance signals I and Q are respectively distributed in frequency bands of approximately 1.5 MHz and 0.5 MHz from the centered chrominance subcarrier frequency, i.e., fsc=3.58 MHz.

FIG. 2 shows spectrums of luminance signal Y and color signal C distributed near a chrominance subcarrier frequency fsc shown in FIG. 1. The spectrum of luminance signal Y is repeatedly shown with a principal frequency nFn, and also the spectrum of color signal C is repeatedly shown with a principal frequency $\{(2n+1)Fn/2\}$. Accordingly, when a composite video signal has a picture rapidly changed in a vertical direction, the superposition between the spectrums of luminance signal Y and color signal C is severed. Here, n is an integer, and Fn is a line (horizontal sync signal) frequency. And, the line frequency Fn is 15.75 KHz, in case of an NTSC type.

FIG. 3 is a circuit diagram of a conventional comb filter. In FIG. 3, the conventional comb filter comprises a band-pass filter 12 for passing only a signal existing in a band of approximately 2 MHz to 4.3 MHz near a chrominance subcarrier frequency, i.e., 3.58 MHz, from a composite video signal CV received through an input terminal 10, a first delay 14 for delaying an output signal V1 of the band-pass filter 12, a second delay 16 for again delaying an output signal V2 of the first delay 14, first and second amplifiers 18 and 20 for amplifying the output signals V1 and V3 of the band-pass filter 12 and the second delay 16 by a half times, an adder 22 for adding output signals of the first delay 14 and the first and second amplifiers 18 and 20, and a third amplifier 24 for amplifying an output signal of the adder 22 by a half times. The comb filter shown in FIG. 3 is a 2H (here, H is a period of horizontal sync signal) comb filter if the delay period of the first and second delays 14 and 16 is one line period, and on the other hand, is a 2F (here, F is a period of frame) comb filter if the delay period of the first and second delays 14 and 16 is one frame period. The signal V1 filtered in the band-pass filter 10 is sequentially delayed in the first and second delays 14 and 16, thereby outputting signals V2 and V3. The output signal V1 of the band-pass filter 10 and the output signal V3 of the second delay 16 are amplified in the first and second amplifiers 18 and 20, and then are added with an output signal V2 of the first delay 14 by the adder 22. The third amplifier 24 amplifies an output of adder 22 by a half times, thereby obtaining an amplified signal $V0 = \frac{1}{2}(V2 - \frac{1}{2}(V1+V3))$.

At this time, if the signs of output signals of first and second amplifies 18 and 20 are negative, an output signal V0 becomes a color signal and contrarily, if the signs are positive, an output signal V0 becomes a luminance signal.

When a composite video signal having a picture rapidly changed in a vertical direction is inputted, the line comb filter having a line delay cannot exactly separate a luminance signal and a color signal, thereby generating an interference phenomenon between a luminance signal and a color signal, and deteriorating vertical. resolution of color signal. Also, the frame comb filter having a frame delay cannot exactly separate a composite video signal having a motion picture in motion into a luminance signal and a color signal, thereby deteriorating picture quality.

To improve such problems of comb filter, a motion adaptive luminance/color signal separating device shown in FIG. 4 is developed. The motion adaptive luminance/color signal separating device comprises a line comb filter 30 and a frame comb filter 32 for separating a composite video signal CV received through an input terminal 28 into a luminance signal and a color signal by the line correlation and the frame correlation, respectively, a motion detector 34 for detecting a motion of the composite video signal CV, and a mixer 36 for selecting output signals of the line comb filter 30 and frame comb filter 32 according to an output signal of the motion detector 13 and outputting the selected signal through an output terminal 38. In the conventional motion adaptive luminance/color signal separating device having the above constitution, a composite video signal CV inputted in the input terminal 28 is separated into a luminance signal and a color signal by the line comb filter 30 and the frame comb filter 32, and the separated signals are inputted to the mixer 36. The motion detector 13 detects a motion component from a composite video signal and supplies the detected motion signal as a control signal to the mixer 36. Then, the mixer 36 selects the luminance signal and color signal separated by the line comb filter 30 when a motion component exists in a composite video signal CV, and selects the luminance signal and color signal separated by the frame comb filter 32 when a motion does not exist.

However, the above-mentioned conventional motion adaptive luminance/color signal separating device relatively exactly separates a luminance/color signal when the motion component of composite video signal CV is exactly detected, but the picture motion component cannot be exactly detected from a composite video signal having mixed luminance signal and color signal. Accordingly, when a composite video signal having a motion component of picture is determined to have no motion, the conventional motion adaptive luminance/color signal separating device wrongly separates a luminance signal and a color signal from a composite video signal, thereby generating a rainbow pattern or dot trouble due to cross-color and cross-luminance components. And, when a composite video signal having no motion of picture is determined to have a motion component, the conventional motion adaptive luminance/color signal separating device generates the reduction and deterioration of resolution of color signal, and the deterioration of picture quality due to the interference between the luminance signal and color signal.

SUMMARY OF THE INVENTION

Accordingly, it is an object of the present invention to provide a luminance/color signal separating device which can separate a composite video signal into a luminance signal and a color signal according to spectrum distribution of luminance signal and color signal included in a composite video signal.

To achieve the object, a luminance/color signal separating device of the present invention comprises:
a means for receiving a composite video signal;
a band-pass filter means for detecting a composite video signal existing in a predetermined frequency band including a centered chrominance subcarrier frequency from the composite video signal;
a band-rejection filter means for removing a composite video signal existing in a predetermined frequency band including a centered chrominance subcarrier frequency from the composite video signal;
a first line comb filter means for separating a luminance signal and a color signal from an output signal of the band-pass filter means by a correlation between three lines;
a second line comb filter means for separating a luminance signal and a color signal from an output signal of the band-pass filter means by a correlation between five lines;
a frame comb filter means for separating a luminance signal and a color signal from an output signal of the band-pass filter means by a correlation between frames;
a vertical variation detecting means for detecting a variation component of picture in a vertical axis from an output signal of the band-pass filter means;
a temporal variation detecting means for detecting a variation component in a temporal axis from an output signal of the band-pass filter means;
a horizontal variation detecting means for detecting a variation of picture in a horizontal axis from the composite video signal;
a first mixing means for mixing color signals separated by the first and second comb filter means and the frame comb filter means and an output signal of the band-pass filter means according to detected results of the horizontal, vertical and temporal variation detecting means; and
a second mixing means for mixing luminance signals separated by the first and second line comb filter means and an output signal of the band-rejection filter means, according to detected results of the horizontal, vertical and temporal variation detecting means.

By the above constitution, a luminance/color signal separating device of the present invention separates a composite video signal into a luminance signal and a color signal according to spectrum distribution of luminance signal and color signal, thereby preventing the deterioration of picture quality and vertical resolution and the dot trouble.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Figure 5A:
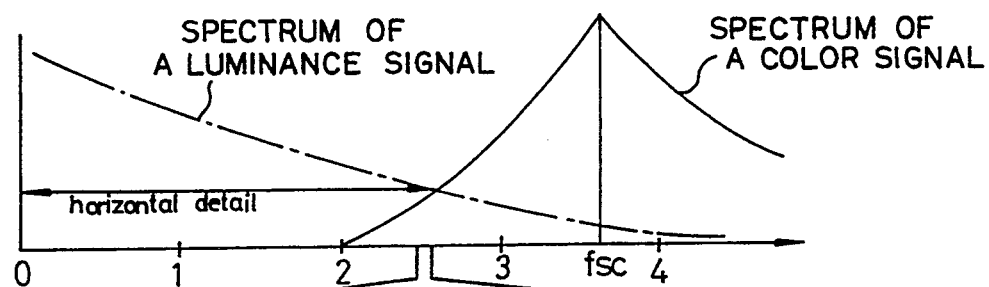
FIGS. 5A to 5C are views showing one-dimensional spectrum structure of a composite video signal having a picture varied in horizontal, vertical and temporal directions.

Before the description of an embodiment of the present invention, a spectrum structure of a composite video signal is described when a picture is rapidly changed in horizontal, vertical, and temporal directions. First of all, when a picture is rapidly changed in a horizontal direction, a composite video signal has spectrums of luminance signal and chrominance signal in which a large portion is overlapped in a gross structure shown in FIG. 5A.

Figure 5B:
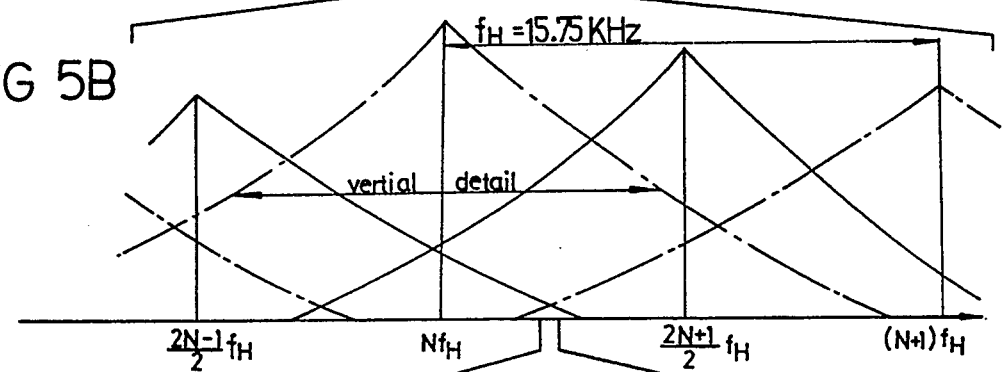
Figure 5C:
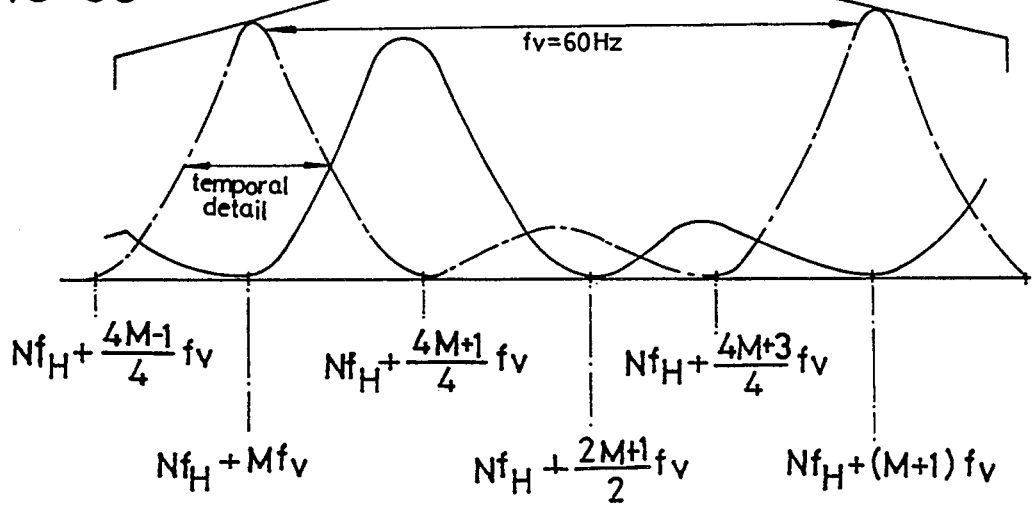

The phenomenon having the large overlapped portion in spectrums of luminance signal and color signal in the gross structure, is generated when a luminance signal and a color signal have many high frequency components. Secondly, when a picture is rapidly changed in a vertical direction, a composite video signal has largely overlapped spectrums of luminance signal and chrominance signal in a fine structure shown in FIG. 5B. Thirdly, when a picture is rapidly changed in a temporal direction, a composite video signal has spectrums of luminance signal and chrominance signal having largely overlapped portion in a superfine structure shown in FIG. 5C. Finally, when a picture is rapidly changed in a diagonal direction, a composite video signal has spectrums of luminance signal and chrominance signal having largely overlapped portion in the gross structure shown in FIG. 5A and in the fine structure shown in FIG. 5B.

Figure 1:
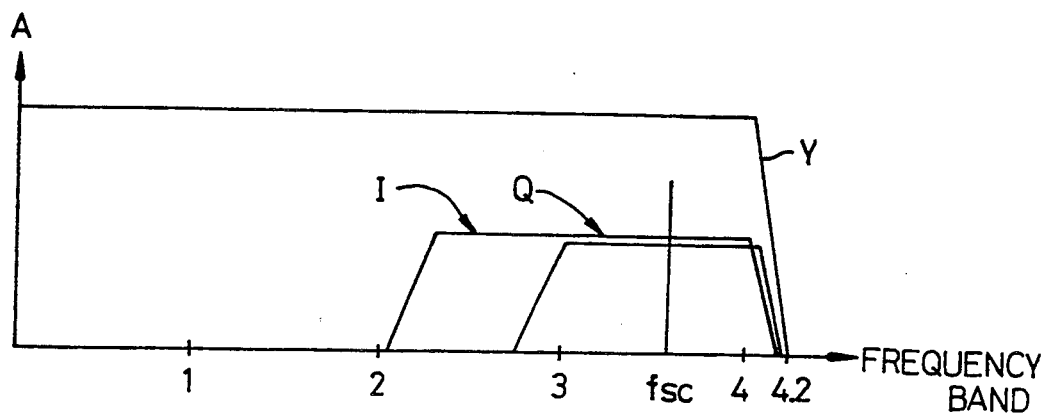
FIG. 1 is a view illustrating a spectrum of a composite video signal of NTSC type.
Figure 2:
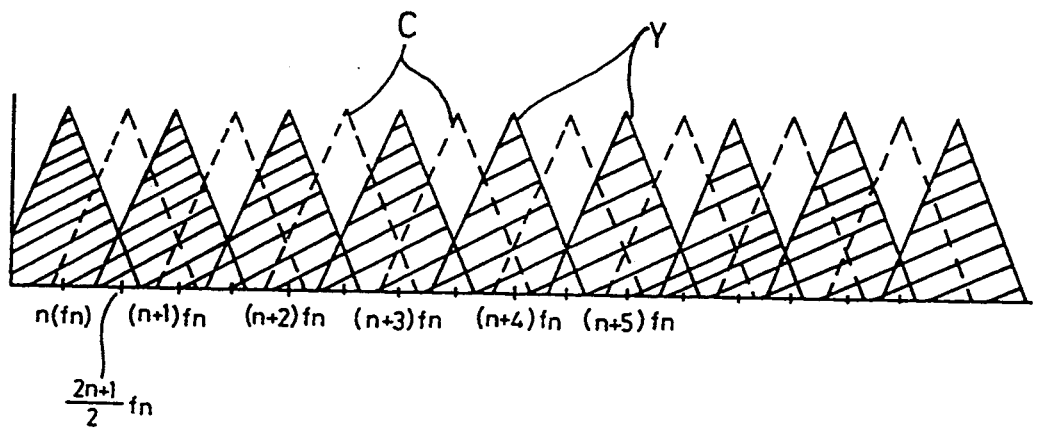
FIG. 2 is a view illustrating spectrums of luminance signal and color signal distributed near a chrominance subcarrier frequency shown in FIG. 1.
Figure 3:
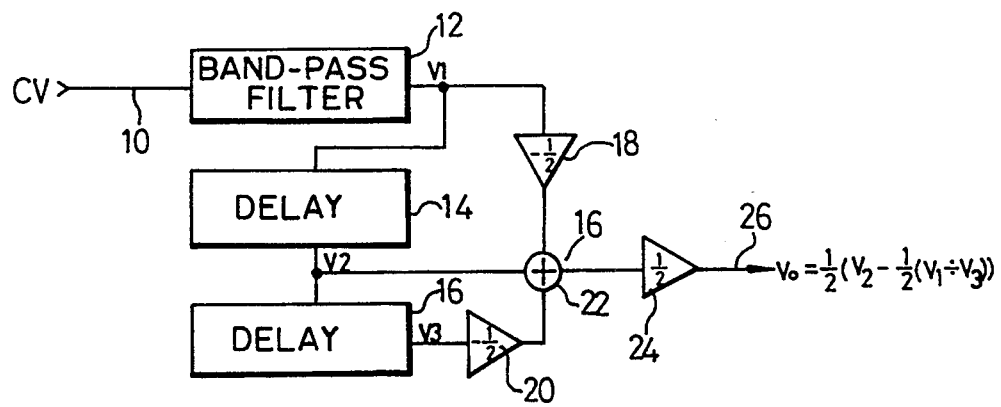
FIG. 3 is a circuit diagram of conventional comb filter.
Figure 4:
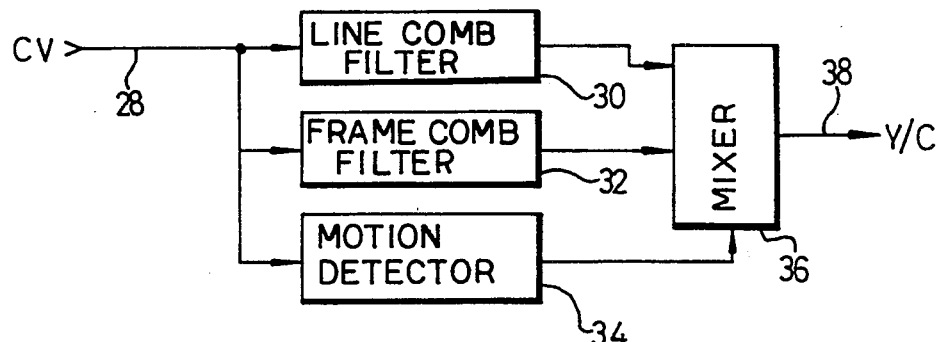
FIG. 4 is a circuit diagram of a conventional motion adaptive luminance/color signal separating device.
Figure 6:
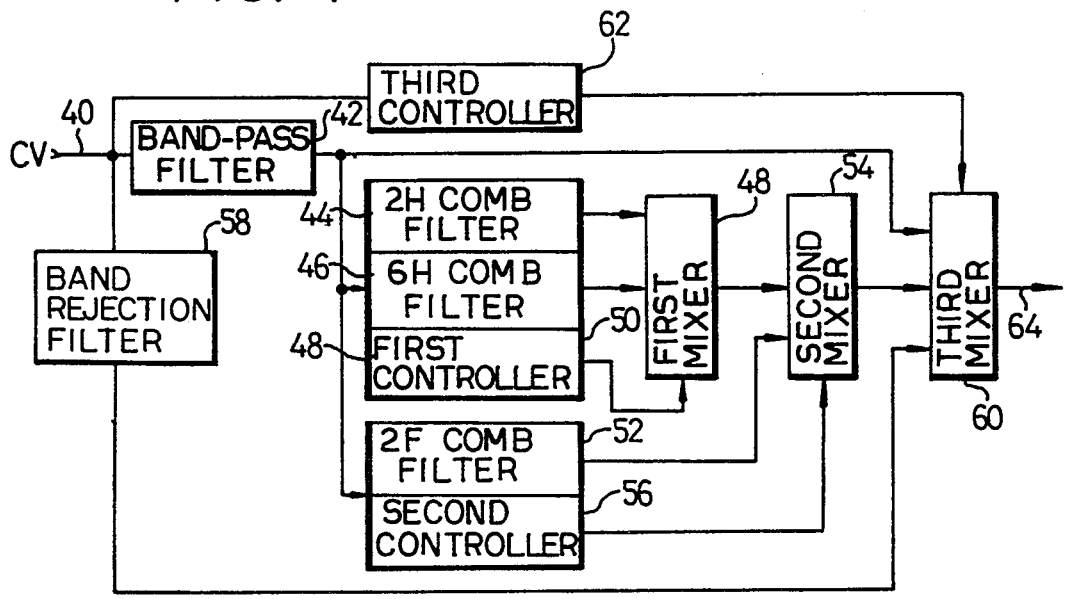
FIG. 6 is a block diagram of a luminance/color signal separating device according to an embodiment of the present invention.

FIG. 6 is a block diagram of a luminance/color signal separating device according to an embodiment of the present invention. In FIG. 6, the luminance/color signal separating device comprises a band-pass filter 42 for detecting a composite video signal near a chrominance subcarrier frequency from a composite video signal received through an input terminal 40, 2H, 6H and 2F comb filters 44, 46, and 52 for separating a luminance signal and a color signal from a composite video signal, i.e., an output signal of the band-pass filter 42, according to correlations between three lines, five lines, and frames, first and second controllers 50 and 56 for detecting a picture variation of vertical and temporal axes from a composite video signal supplied from the band-pass filter 42 and generating control signals, a first mixing portion 48 for selecting output signals of the 2H and 6H comb filters 44 and 46 according to an output signal of the first controller 50, a second mixing portion 54 for selecting output signals of the first mixing portion 48 and the 2F comb filter 52 according to an output signal of the second controller 56, a band-rejection filter 58 for removing a composite video signal existing in a predetermined band near a chrominance subcarrier frequency from the composite video signal CV, a third controller 62 for determining an energy rate of composite video signals in a frequency band near a chrominance subcarrier frequency and in a frequency band near a half of chrominance subcarrier frequency, and generating a control signal corresponding to the determined energy rate, and a third mixing portion 60 for selecting output signals of the band-pass filter 42, second mixing portion 54 and band-rejection filter 58 according to a control signal of the third controller 62, and outputting the selected signal through an output terminal 64.

In the luminance/color signal separating device, the band-pass filter 42 detects a composite video signal near a chrominance subcarrier frequency from the composite video signal CV received in the input terminal 40 and supplies the filtered composite video signal to the 2H, 6H and 2F comb filters 44, 46 and 52 and also to the first and second controllers 50 and 56. The 2H comb filter 44 separates a luminance signal and a color signal from the filtered composite video signal by a correlation of three lines and supplies the separated luminance signal and color signal to the first mixing portion 48. And, the 6H comb filter 46 supplies to the first mixing portion 48 a luminance signal and a color signal detected from an output signal of the band-pass filter 42 by the correlation of five lines. The first controller 50 detects a variation of vertical component of picture from the composite video signal supplied from the band-pass filter 42 and supplies the detected vertical variation component to the first mixing portion 48 as a control signal. Then, the first mixing portion 48 selects a luminance signal and a color signal supplied from the 2H comb filter 44 or from the 6H comb filter 46 according to a control signal supplied from the first controller 50 and supplies the selected signals to the second mixing portion 54. In other words, when an output signal of the band-pass filter 42 has a picture largely changed in a vertical direction, i.e., when it has largely overlapped spectrums of luminance signal and color signal in a fine structure, the first mixing portion 48 selects an output signal of the 6H comb filter 46, thereby preventing the deterioration of picture quality due to cross-color and cross-luminance components.

Contrarily, when an output signal of the band-pass filter 42 has a picture slightly changed in a vertical direction, an output signal of 2H comb filter 44 is selected to prevent the deterioration of vertical resolution.

The 2F comb filter 52 separates a luminance signal and a color signal from an output signal of band-pass filter 21 by a correlation between frames, and supplies the separated luminance signal and color signal to the second mixing portion 54. The second controller 56 detects a variation of picture in a temporal axis from a composite video signal supplied from the band-pass filter 42 and supplies the detected temporal variation component to the second mixing portion 54 as a control signal. Then, the second mixing portion 54 selects an output signal of the first mixing portion 48 or an output signal of the 2F comb filter 52 according to a control signal supplied from the second controller 56 and supplies the selected signal to the third mixing portion 60.

In more detail, when the composite video signal supplied from the band-pass filter 42 has a picture largely changed in a temporal axis, i.e., when it has largely overlapped spectrums of color signal and luminance signal in a superfine structure, the second mixing portion 54 selects an output signal of 2H comb filter 44 or 6H comb filter 46 outputted from the first mixing portion 48 and contrarily, when an output signal of the band-pass filter 42 has a picture slightly changed in a temporal axis, i.e., when spectrums of luminance signal and color signal are very slightly overlapped in a superfine structure, the second mixing portion 54 selects an output signal of 2F comb filter 52.

Also, the band-rejection filter 58 filters the composite video signal CV supplied from the input terminal 40 and supplies to the third mixing portion 60 a composite video signal where a composite video signal component near a chrominance subcarrier frequency is removed. The third controller 62 detects an energy rate of composite video signal components of a composite video signal near a chrominance subcarrier frequency and near a half of chrominance subcarrier frequency, and generates a control signal having reciprocal logic states according to the detected energy rate.

The third mixing portion 60 selects an output signal of the band-rejection filter 58 and an output signal of the band-pass filter 42 as a luminance signal and a color signal or selects a color signal and a luminance signal supplied from the second mixing portion 54 and an output signal of the band-rejection filter 58, according to the control signal from the third controller 62. When the third mixing portion 60 selects an output signal of second mixing portion 54 and an output signal of the band-rejection filter 58, a luminance signal outputted from the second mixing portion 54 is mixed with an output signal of the band-rejection filter 58. In more detail, when the energy rate between a composite video signal component near the chrominance subcarrier frequency and a composite video signal component near a half of chrominance subcarrier frequency is greater than a predetermined value, the third mixing portion 60 selects an output signal of the band-rejection filter 58 and an output signal of the band-pass filter 42 and supplies the selected signals through the output terminal 64 as a luminance signal and a color signal.

Figure 7A:
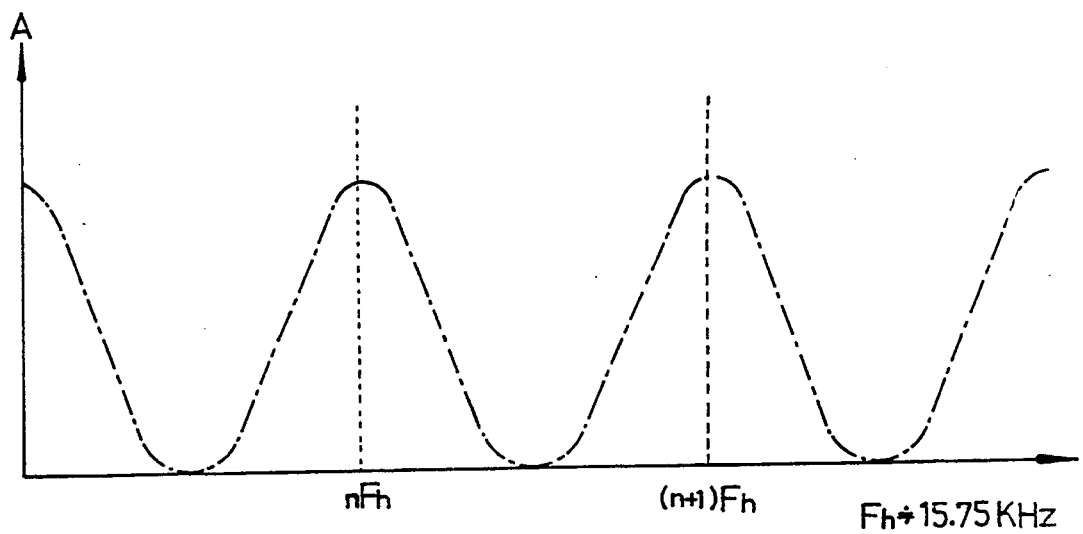
FIGS. 7A to 7C are characteristic diagrams of output signals at the respective portions shown in FIG. 6.
Figure 7B:
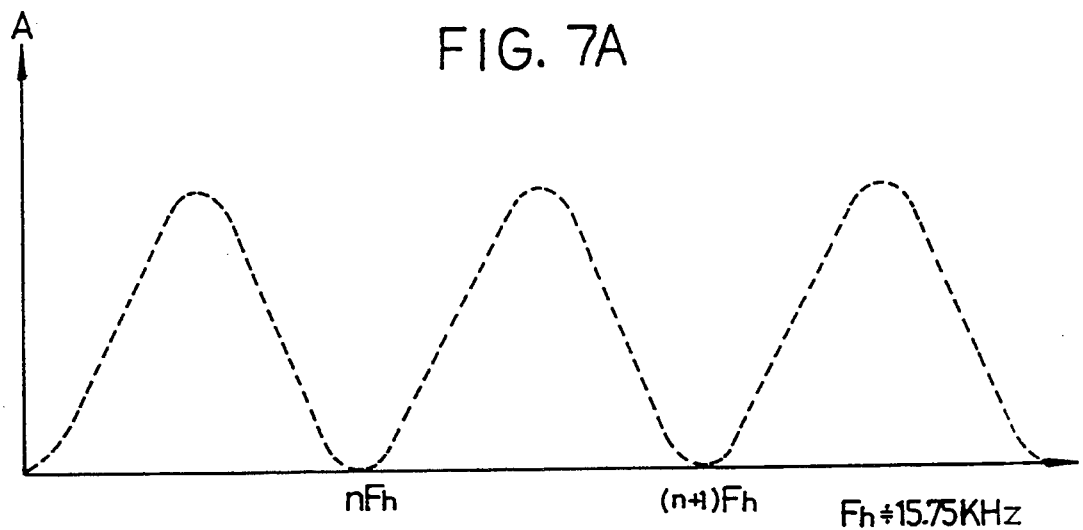
Figure 7C:
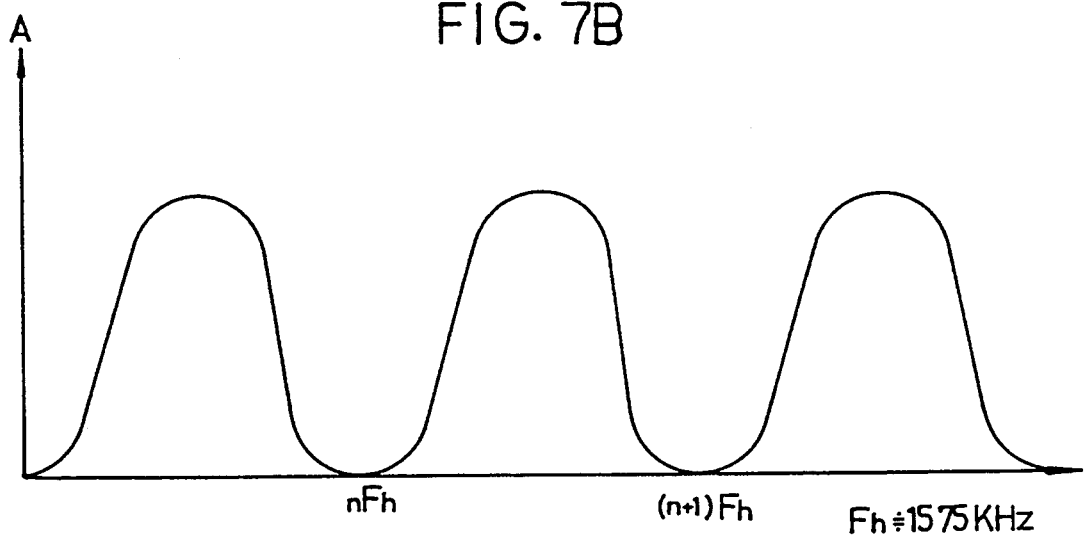

Contrarily, when the energy rate between a composite video signal component near the chrominance subcarrier frequency and a composite video signal component near a half of chrominance subcarrier frequency is smaller than a predetermined value, the third mixing portion 60 selects a luminance signal and a color signal supplied from the second mixing portion 54, mixes the selected luminance signal supplied from the mixing portion 54 with the output signal of band-rejection filter 58, and outputs the mixed signal and the color signal supplied from the second mixing portion 54 through the output terminal 64 as a luminance signal and a color signal. As a result, when the energy rate between the composite video signal component near a chrominance subcarrier frequency and the composite video signal component near a half of chrominance subcarrier frequency is very large, i.e., when the composite video signal CV has a still picture, a luminance signal is distributed in a low frequency region, and a color signal is distributed near a chrominance subcarrier frequency (in a high frequency region). In this case, an output signal of the band-rejection filter 58 has almost all of luminance signal components, and also an output signal of the band-pass filter 42 has only color signal components. Meanwhile, a luminance signal outputted in the 2H comb filter 44 has a maximum amplitude at nFn frequency, as shown in FIG. 7A. And, a color signal outputted in the 2H comb filter 44 has a large gain at $\frac{1}{2}(n+1)Fn$ frequency, as shown in FIG. 7B. Also, a luminance signal outputted in the 6H comb filter 46 has a maximum amplitude at nFn frequency, as shown in FIG. 7C. Similarly, a color signal outputted in the 6H comb filter 46 has a maximum amplitude at $\frac{1}{2}(n+1)Fn$ frequency (not shown). However, as shown in FIGS. 7A and 7C, a luminance signal outputted in the 6H comb filter 46 has a sharp amplitude characteristic with respect to frequency, compared with the luminance signal supplied from the 2H comb filter 44, and accordingly, is rarely interfered by a color signal component. Similarly, the color signal outputted in the 6H comb filter 46 is not interfered by a luminance signal component, compared with the color signal outputted in the 2H comb filter 44. The 2H comb filter 44 comprises a luminance-signal 2H comb filter for separating a luminance signal from a composite video signal and a color-signal 2H comb filter for separating a color signal from the composite video signal. As the same way, the 6H comb filter 46 comprises a luminance-signal 6H comb filter and a color-signal 6H comb filter.

Figure 8:
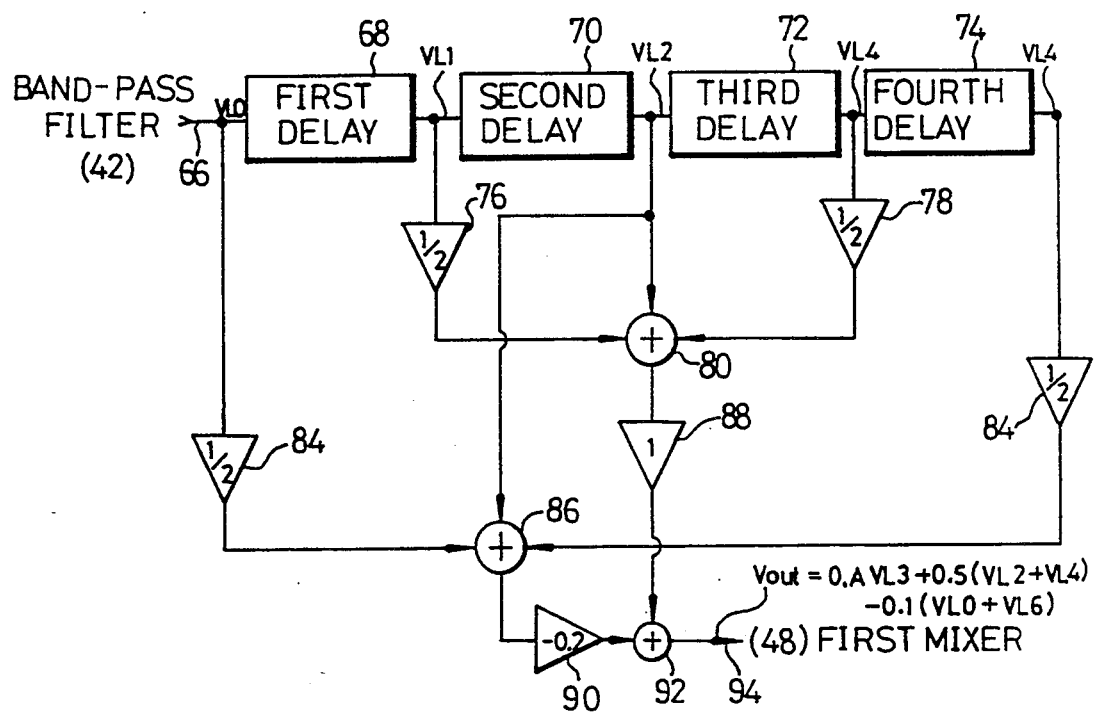
FIG. 8 is a detailed circuit diagram of a 6H comb filter shown in FIG. 6.

With reference to FIG. 8, a detailed circuit diagram of luminance-signal 6H comb filter included in the 6H comb filter 46 shown in FIG. 6. In FIG. 8, the luminance-signal 6H comb filter comprises first to fourth line delays 68, 70, 72 and 74 serially connected to an input terminal 66, and first and second amplifiers 76 and 78 for amplifying amplitudes of output signals of the first and third line delays 68 and 72 by a half times, respectively. The first to fourth delays 68, 70, 72 and 74 delay sequentially by two lines, one line, one line, and two lines, the filtered composite video signal VL supplied from the band-pass filter 42 shown in FIG. 6 through the input terminal 66, thereby generating delayed composite video signals VL2, VL3, VL4 and VL6. The first amplifier 76 amplifies the output signal VL1 of the first delay 68 to make its amplitude be a half, and supplies the amplified composite video signal to the first adder 80. The second amplifier 78 amplifies the output signal VL3 of the third delay 72 to make its amplitude be a half, and supplies the amplified composite video signal to the first adder 80. Then, the first adder 80 adds the output signal VL2 of second delay 70 and the output signals of first and second amplifiers 76 and 78, thereby generating a luminance signal.

The luminance-signal 6H comb filter additionally comprises a third amplifier 82 for amplifying the filtered composite video signal VL0 supplied in the input terminal 66 to have a half amplitude, a fourth amplifier 84 for amplifying the output signal VL6 of the fourth delay 74 to have a half amplitude, and a second adder 86 for adding output signals of the third amplifier 82 and the fourth amplifier 84 and an output signal VL3 of the second delay 70, thereby detecting a luminance signal. The luminance signal detected in the second adder 86 is amplified by a sixth amplifier 90 to have an amplitude of −0.2, and is then supplied to a third adder 92. The luminance signal generated in the first adder 80 is supplied to the third adder 92 via a fifth amplifier 88 having a buffering function. Then, the third adder 92 adds the output signals of the fifth and sixth adders 88 and 90 and generates a luminance signal (Vout=0.4VL3+0.5(VL2+VL4)− 0.1(VL0+VL6)) having an amplitude characteristic, as shown in FIG. 7C, to be supplied to the first mixing portion 48 shown in FIG. 6 through an output terminal 94.

Meanwhile, the color-signal 6H comb filter included in the 6H comb filter has the same circuit constitution as the luminance-signal 6H comb filter shown in FIG. 8, except that the amplifying rates of the first to fourth amplifiers 76, 68, 82 and 84 are $-\frac{1}{2}$. The color-signal 6H comb filter generates a color signal of Vout=0.4VL3−0.5(VL2+VL4)+0.1(VL0+VL6) from a composite video signal shown in FIG. 6.

Figure 9:
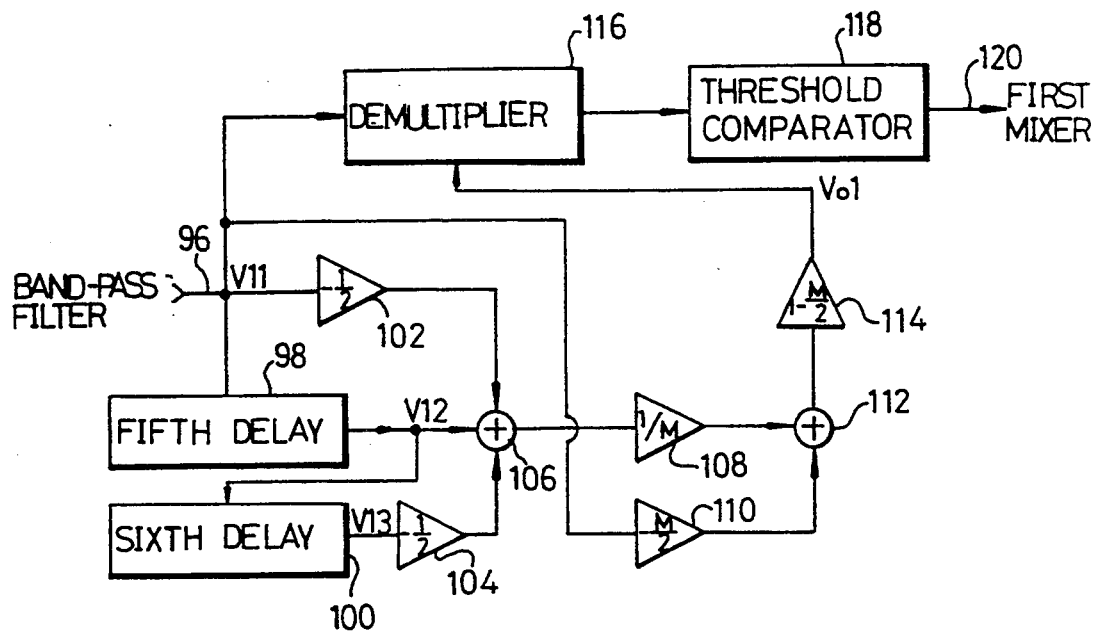
FIG. 9 is a detailed circuit diagram of first and second controllers shown in FIG. 6.
Figure 10:
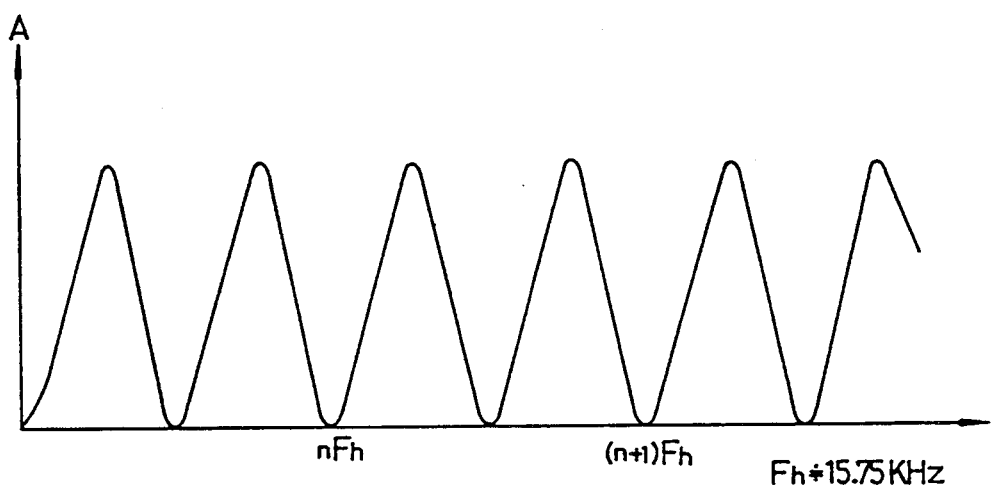
FIG. 10 is a characteristic diagram of output signal of an amplifier shown in FIG. 9.

FIG. 9 is a detailed circuit diagram of the first controller 50 shown in FIG. 6. In FIG. 9, the first controller comprises fifth and sixth delays 98 and 100 serially connected to an input terminal 96 for delaying by one line the composite video signal VL0 supplied from the band-pass filter 42 shown in FIG. 6 through the input terminal 96 and generating delayed composite video signals VL11 and VL12, an eighth amplifier 104 for amplifying an output signal VL12 of the sixth delay 100 to make its amplitude be a negative half, and a seventh amplifier 102 for amplifying the composite video signal VL0 supplied from the band-pass filter 42 to the input terminal 96 to make its amplitude be a half. The composite video signals VL0 and VL12 amplified in the seventh and eighth amplifiers 102 and 104 are supplied to a fourth adder 106. The fourth adder 106 adds the output signals of seventh and eighth amplifiers 102 and 104 and a delayed composite video signal VL11 supplied from the fifth delay 98, and supplies the added composite video signal to a ninth amplifier 108. The ninth amplifier 108 amplifies the output signal of fourth adder 106 by a 1/M times, and supplies the amplified color signal to a fifth adder 112. The fifth adder 112 adds an output signal of the ninth amplifier 108 to the composite video signal VL0 amplified to be a −M/2 times by a tenth amplifier 110, and supplies the added signal to an eleventh amplifier 114. Here, M is a maximum output value of the fifth adder 112, i.e., approximately 1.414. The eleventh amplifier 114 amplifies an output signal Voi of the fifth adder 112 by an amplifying rate of 1−M/2, and generates a composite video signal having an amplitude characteristic shown in FIG. 10. The output signal of the eleventh amplifier 114, shown in FIG. 10 has a maximum amplitude at a frequency where a luminance signal and a color signal are overlapped in the fine structure shown in FIG. 5B, i.e., at $\frac{1}{4}(n+1)$Fn and $\frac{3}{4}(n+1)$Fn frequencies.

The first controller additionally comprises a first demultiplier 116 for dividing the composite video signal VL0 supplied from the band-pass filter 42 through the input terminal 96 by the composite video signal V01 supplied from the eleventh amplifier 114, and supplying the divided value to a threshold comparator 118. The divided composite video signal generated in the first demultiplier 116 is a signal including a vertical variation component of picture and has a high level when the overlapped region of luminance signal and chrominance signal is large in the fine structure shown in FIG. 5B. The threshold comparator 118 compares the level of output signal of the first demultiplier 116 with its set threshold, generates a control signal having high or low logic according to the compared result, and supplies the generated control signal to the first mixing portion 48 through an output terminal 120.

When the fifth and sixth delays 98 and 100 are constituted by frame memories for delaying a composite video signal by one frame, the circuit shown in FIG. 9 is the second controller 56 for detecting a variation component of picture in a temporal axis and generating a control signal to be supplied to the second mixing portion 54 according to the detected temporal variation component. In this case, the output signal of the eleventh amplifier 114 has a composite video signal component of a frequency region where a luminance signal and a color signal are overlapped in the superfine structure shown in FIG. 5C. The composite video signal divided in the first demultiplier 116 has a temporal axis variation component of picture. Also, the control signal generated in the first threshold comparator 118 is supplied to the second mixing portion 54 through the output terminal 120.

Figure 11:
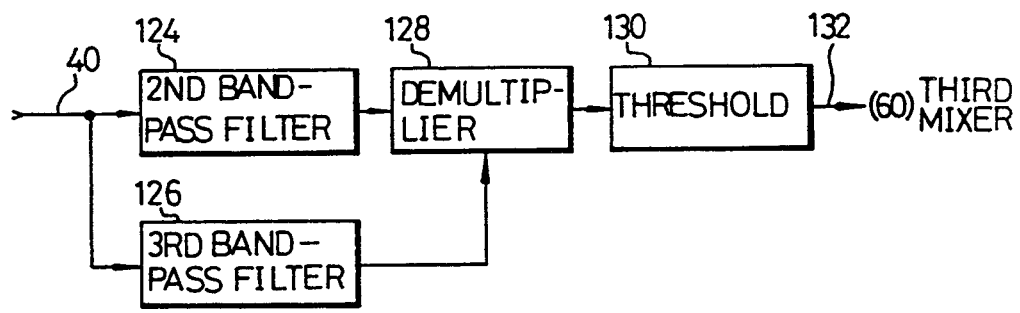
FIG. 11 is a detailed circuit diagram of a third controller shown in FIG. 6.

FIG. 11 is a detailed circuit diagram of the third controller 62 shown in FIG. 6. In FIG. 11, the third controller 62 comprises a second band-pass filter 124 for filtering a composite video signal received through an input terminal 40 and detecting a composite video signal existing in a predetermined frequency band near a chrominance subcarrier frequency, and a third band-pass filter 126 for filtering the composite video signal received in the input terminal 40 and detecting a composite video signal of a predetermined frequency band near a half of chrominance subcarrier frequency. An output signal of the second band-pass filter 124 is divided by an output signal of the third band-pass filter 126 in a second demultiplier 128. The composite video signal divided in the second demultiplier 128 is supplied to a second threshold comparator 130 as a signal having a horizontal variation component of picture. An output signal of the second demultiplier 128 has the lowest level when a picture is largely changed in a horizontal direction and contrarily, has the highest level when a picture is very slightly changed in a horizontal direction. The second threshold comparator 130 compares the level of output signal of the second demultiplier 128 with its set threshold, and generates a control signal having high or low logic according to the compared result. The control signal generated in the second threshold comparator 130 is supplied to the third mixing portion 60 shown in FIG. 6 through an output terminal 132.

Figure 12A:
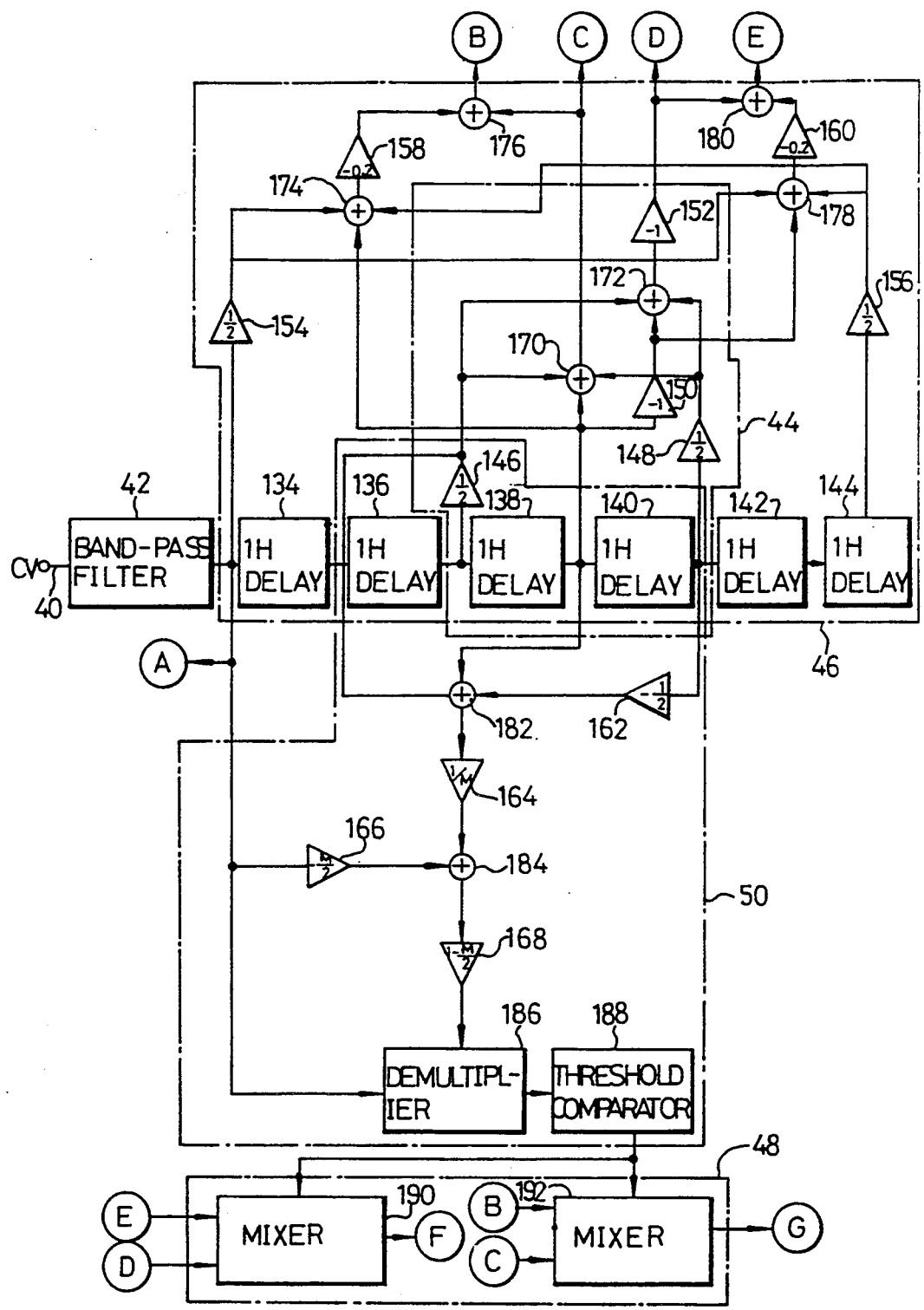
FIGS. 12A and 12B are detailed circuit diagrams of a luminance/color signal separating device shown in FIG. 6.
Figure 12B:
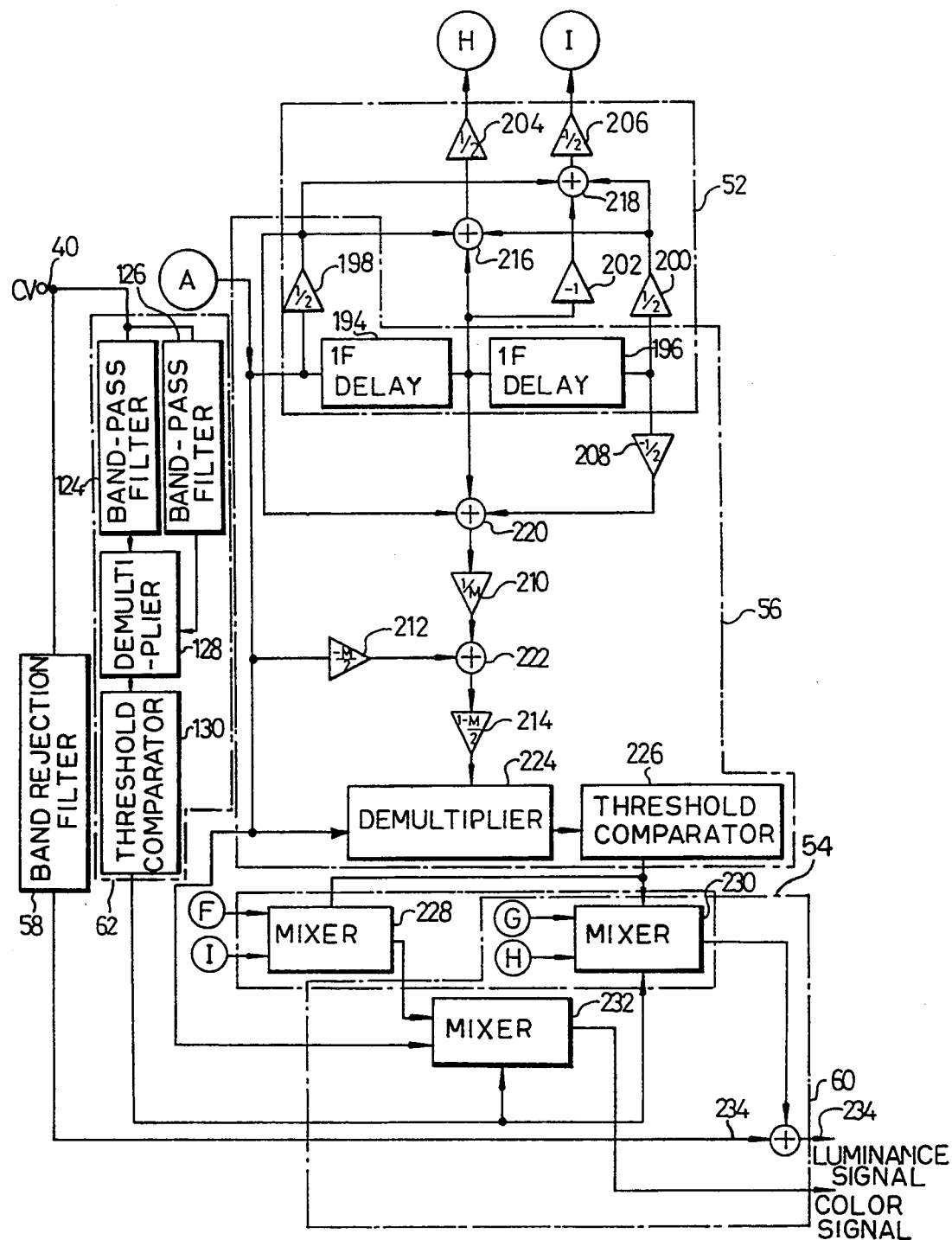

FIGS. 12A and 12B are detailed circuit diagrams of luminance/color signal separating device shown in FIG. 6. With reference to FIGS. 12A and 12B, in the luminance/color signal separating device, six line delays 134 to 144 are properly and repeatedly used in the 2H comb filter 44, the 6H comb filter 46 and the first controller 52, and two frame delays 194 and 196 are commonly used in the 2F comb filter 52 and the second controller 56, so that the constitution is simplified and the number of required components is minimized.

The 2H comb filter 44 comprises two delays 138 and 140, four amplifiers 146 to 152, and two adders 170 and 172, and separates a luminance signal and a color signal from a composite video signal near a chrominance subcarrier frequency supplied from the band-pass filter 42. The 2H comb filter 44 outputs an output signal of amplifier 152 as a color signal existing in a frequency band near a chrominance subcarrier frequency, and outputs an output signal of adder 170 as a luminance signal existing in a frequency band near a chrominance subcarrier frequency.

The 6H comb filter 56 comprises six line delays 134 to 144, eight amplifiers 146 to 160, and six adders 170 to 180, and separates a color signal and a luminance signal from an output signal of the band-pass filter 42. The 6H comb filter 46 outputs an output signal of adder 176 and an output signal of adder 180 as a luminance signal and a color signal existing in a frequency band near a chrominance subcarrier frequency.

The first controller 50 comprises two delays 138 and 140, five amplifiers 146, 162 to 168, two adders 182 and 184, a demultiplier 186, a threshold comparator 188, and detects a vertical variation component of picture from an output signal of the band-pass filter 42. The first controller 50 supplies the output signal of the threshold comparator 188 to the first mixing portion 48 as a control signal according to the magnitude of detected vertical variation component.

The 2F comb filter 52 comprises two frame delays 194 and 196, five amplifiers 198 to 206, and two adders 216 and 218, and separates a luminance signal and a color signal from an output signal of the band-pass filter 42.

And, the output signal of the amplifier 204 becomes a luminance signal existing in a frequency band near a chrominance subcarrier frequency, and the output signal of the amplifier 206 becomes a color signal existing in a frequency band near a chrominance subcarrier frequency.

The second controller 56 comprises two frame delays 194 and 196, five amplifiers 198, 208 to 214, two adders 220 and 222, a demultiplier 224 and a threshold comparator 226, and detects a temporal variation component of picture from an output signal of the band-pass filter 42. The output signal of the threshold comparator 226 is supplied to the second mixing portion 54 as a control signal generated by the detected temporal variation component.

The first mixing portion 48 comprises two mixers 190 and 192 and the mixer 190 selects a color signal generated in the 2H comb filter 44 (i.e., an output signal of the amplifier 152) or a color signal generated in the 6H comb filter 46 (i.e., an output signal of the adder 180) by a control signal supplied from the threshold comparator 188. Also, the mixer 192 selects a luminance signal generated in the 2H comb filter 44 (i.e., an output signal of the adder 170) or a luminance signal generated in the 6H comb filter 46 (i.e., an output signal of the adder 176) by a control signal generated from the threshold comparator 188.

Meanwhile, as shown in FIG. 11, the third controller 62 comprises the first and second band-pass filters 124 and 126, the demultiplier 128, and the threshold comparator 130. The third controller 62 detects a horizontal variation component of picture from the composite video signal received in the input terminal 40, and generates a control signal having different logic states according to the level of detected horizontal variation component. The control signal generated in the third controller 62 is supplied to the third mixing portion 60.

The second mixing portion 54 comprises two mixers 228 and 230, and the third mixing portion 60 comprises two mixers 230 and 232 and an adder 234. The mixer 228 selects a color signal supplied from the mixer 190 or a color signal supplied from the 2F comb filter 52 (i.e., an output signal of the amplifier 206) according to a control signal supplied from the second controller 56, and supplies the selected color signal to the mixer 232. The mixer 230 selects a luminance signal supplied from the mixer 192 or a luminance signal supplied from the 2F comb filter 52 (i.e., an output signal of the amplifier 204) according to a control signal supplied from the second controller 56, and mutes or transmits to an adder 234 the selected luminance signal according to a logic state of control signal supplied from the third controller 62. The adder 234 adds an output of the mixer 230 to the luminance signal supplied from the band-rejection filter 58, and outputs the added luminance signal through an output terminal 236. The mixer 232 selects a color signal supplied from the band-pass filter 42 or a color signal supplied from the mixer 190 according to a control signal supplied from the third controller 62, and outputs the selected color signal through an output terminal 238.

As described above, the present invention separates a composite video signal having a picture rapidly changed horizontal, vertical, diagonal, and temporal directions into a luminance signal and a color signal according to spectrum distribution of luminance signal and color signal, thereby having an advantage of preventing the deterioration of vertical resolution of color signal, the deterioration of color signal, and the deterioration of horizontal resolution. From this advantage, the present has another advantage of reproducing a sharp picture.

What is claimed is:

1. A luminance/color signal separating device comprising:
    a means for receiving a composite video signal;
    a band-pass filter means for detecting a composite video signal existing in a predetermined frequency band having a centered chrominance subcarrier frequency from said composite video signal;
    a band-rejection filter means for removing a composite video signal existing in a predetermined frequency band having a centered chrominance subcarrier frequency from said composite video signal;
    a first line comb filter means for separating a luminance signal and a color signal from an output signal of said band-pass filter means by a correlation between three lines;
    a second line comb filter means for separating a luminance signal and a color signal from an output signal of said band-pass filter means by a correlation between five lines;
    a frame comb filter means for separating a luminance signal and a color signal from an output signal of said band-pass filter means by a correlation between frames;
    a vertical variation detecting means for detecting a variation component of picture in a vertical axis from an output signal of said band-pass filter means;
    a temporal variation detecting means for detecting a variation component of picture in a temporal axis from an output signal of said band-pass filter means;

a horizontal variation detecting means for detecting a variation of picture in a horizontal axis from said composite video signal;

a first mixing means for mixing color signals separated by said first and second line comb filter means, and said frame comb filter means, and an output signal of said band-pass filter means, according to detected results of said horizontal, vertical and temporal variation detecting means; and a second mixing means for mixing luminance signals separated by said first and second line comb filter means and said frame comb filter means, and an output signal of said band-rejection filter means, according to detected results of said vertical, temporal variation detecting means;

wherein said first mixing means further,

A) selects an output signal of said band-pass filter means, when a variation of picture does not exist in a horizontal direction;

B) selects a color signal separated in said frame comb filter, when a variation of picture exists in a horizontal direction and does not exist in a temporal axis;

C) selects a color signal separated by said first line comb filter, when a variation of picture exists in horizontal and temporal axes, and does not exist in a vertical axis; and D) selects a color signal separated by said second line comb filter, when a variation of picture exists in horizontal, temporal, and vertical axes.

2. A luminance/color signal separating device comprising:

a means for receiving a composite video signal;

a band-pass filter means for detecting a composite video signal existing in a predetermined frequency band having a centered chrominance subcarrier frequency from said composite video signal;

a band-rejection filter means for removing a composite video signal existing in a predetermined frequency band having a centered chrominance subcarrier frequency from said composite video signal;

a first line comb filter means for separating a luminance signal and a color signal from an output signal of said band-pass filter means by a correlation between three lines;

a second line comb filter means for separating a luminance signal and a color signal from an output signal of said band-pass filter means by a correlation between five lines;

a frame comb filter means for separating a luminance signal and a color signal from an output signal of said band-pass filter means by a correlation between frames;

a vertical variation detecting means for detecting a variation component of picture in a vertical axis from an output signal of said band-pass filter means;

a temporal variation detecting means for detecting a variation component of picture in a temporal axis from an output signal of said band-pass filter means;

a horizontal variation detecting means for detecting a variation of picture in a horizontal axis from said composite video signal;

a first mixing means for mixing color signals separated by said first and second line comb filter means, and said frame comb filter means, and an output signal of said band-pass filter means, according to detected results of said horizontal, vertical and temporal variation detecting means;

a second mixing means for mixing luminance signals separated by said first and second line comb filter means and said frame comb filter means, and an output signal of said band-rejection filter means, according to detected results of said vertical, temporal variation detecting means;

wherein said vertical variation detecting means further comprises;

a second band-pass filter means for extracting a composite video signal distributed in a band having principal frequencies of $\frac{1}{4}(n+1)$ Fn and $\frac{3}{4}(n+1)$Fn from an output signal of said band-pass filter means;

a first demultiplying means for dividing an output signal of said band-pass filter means by an output signal of said second band-pass filter means; and a first threshold comparator for comparing an output signal of said first demultiplying means with a threshold of predetermined level to generate a control signal of logic signal type and supplying a generated control signal to said first mixing means.

3. A luminance/color signal separating device comprising:

a means for receiving a composite video signal;

a band-pass filter means for detecting a composite video signal existing in a predetermined frequency band having a centered chrominance subcarrier frequency from said composite video signal;

a band-rejection filter means for removing a composite video signal existing in a predetermined frequency band having a centered chrominance subcarrier frequency from said composite video signal;

a first line comb filter means for separating a luminance signal and a color signal from an output signal of said band-pass filter means by a correlation between three lines;

a second line comb filter means for separating a luminance signal and a color signal from an output signal of said band-pass filter means by a correlation between five lines;

a frame comb filter means for separating a luminance signal and a color signal from an output signal of said band-pass filter means by a correlation between frames;

a vertical variation detecting means for detecting a variation component of picture in a vertical axis from an output signal of said band-pass filter means;

a temporal variation detecting means for detecting a variation component of picture in a temporal axis from an output signal of said band-pass filter means;

a horizontal variation detecting means for detecting a variation of picture in a horizontal axis from said composite video signal;

a first mixing means for mixing color signals separated by said first and second line comb filter means, and said frame comb filter means, and an output signal of said band-pass filter means, according to detected results of said horizontal, vertical and temporal variation detecting means;

a second mixing means for mixing luminance signals separated by said first and second line comb filter means and said frame comb filter means, and an output signal of said band-rejection filter means, according to detected results of said vertical, temporal variation detecting means;

wherein said horizontal variation detecting means further comprises;

a third band-pass filter means for extracting a composite video signal existing in a predetermined frequency band having a centered chrominance subcarrier frequency from said composite video signal supplied from said input means;

a fourth band-pass filter means for extracting a composite video signal existing in a predetermined frequency band having a centered ½-chrominance subcarrier frequency from said composite video signal supplied from said input means;

a second demultiplying means for dividing an output signal of said third band-pass filter means by an output signal of said fourth band-pass filter means; and a second threshold comparing means for comparing an output signal of said second demultiplying means with a threshold of predetermined level to generate a control signal of logic signal type, and supplying a generated control signal to said first and second mixing means.

\* \* \* \* \*